United States Patent Office 3,452,195
Patented June 24, 1969

3,452,195
IRRADIATION APPARATUS WITH SPECIFIC MEANS TO LOAD AND UNLOAD A CHAIN CONVEYOR
Alfred Brunner, Winterthur, Switzerland, assignor to Sulzer Brothers Limited, Winterthur, Switzerland, a Swiss company
Filed Apr. 13, 1965, Ser. No. 447,700
Claims priority, application Switzerland, Apr. 14, 1964, 4,790/64
Int. Cl. H01j 37/20
U.S. Cl. 250—52
1 Claim

ABSTRACT OF THE DISCLOSURE

There is disclosed irradiation apparatus in which a chain conveyor defines a plurality of closed loop paths lying in parallel planes along which loads of material to be irradiated are carried for exposure to a source of radiation. Roller conveyors are provided for bringing the loads to and withdrawing them from the chain conveyor, and these roller conveyors extend collinearly with each other adjacent the chain conveyor and perpendicularly to the planes of the irradiation exposure paths. The material to be irradiated is disposed in containers which are suspended on overhead rollers from rails carved on the chain conveyor, and a pusher bar serves at the loading station to push a container onto the chain conveyor so as to be in position to pass over a first irradiation exposure path and simultaneously to push into a second irradiation exposure path a container which has been carried by the chain conveyor over the first irradiation exposure path and simultaneously to push off of the chain conveyor a container which has been carried over the second irradiation exposure path.

---

The present invention relates to irradiation apparatus in which material to be irradiated, in the form of individual loads, is moved through a plurality of closed paths adjacent a radiation source.

Material to be irradiated, such as for example surgical sewing material like cat-gut which must be sterilized, is moved in such apparatus a plurality of times past a radiation source, e.g., cobalt 60. The material first traverses one closed path, either in, for example, a transport device defining plural travel paths or in one of plural transport devices and is then transferred to the next path (in the first case) or to the next transport device (in the second case). In the case of two-path systems the irradiated material then leaves the irradiation chamber, whereas in the case of multipath systems the excursion is repeated over and over again, each time after shift of the material to a new path.

It is an object of the invention to provide apparatus of this character including transport means which define plural closed paths which are adjacent to the source and which are to be traversed by the material to be irradiated, and to provide in such apparatus for loading and unloading of the transport means, and for transfer of the material to be irradiated from one path to the next, so far as possible in a single direction and in a single operation. According to the invention therefore, a feed device supplies the individual loads to the transport means at a first path defined thereby and in a direction substantially perpendicular to the planes of those paths, while the other loads already supported on the transport means are simultaneously transferred, also in directions perpendicular to those planes, from one path to the next and the load in the last path is removed from the transport means to a discharge device, also in a direction substantially perpendicular to those planes.

In a preferred embodiment of the invention, the transport means take the form of a chain conveyor, which may be oriented vertically, and having or defining two or more paths disposed one beside another. The feed and discharge devices extend substantially horizontally, and their central axes lead on both sides to the paths defined by the vertical chain conveyor, those central axes extending perpendicularly to the planes of those paths. It may then be convenient to provide the feed and discharge devices in the form of undriven inclined conveyors, e.g., roller conveyors or rails on which trolleys or the like can run. Advantageously, a single pusher device shifts the loads from the feed device onto the transport means, from path to path within the transport means, and from the last path thereof to the discharge conveyor.

In another embodiment of the invention, the feed or supply conveyor and the discharge conveyor are drivingly interconnected by an endless chain having at least one member adapted positively to drive the loads. The vertical chain conveyor may include rails from which the loads can be suspended and onto which the loads may be shifted from the supply conveyor and from which they can be shifted to the discharge conveyor, and on which they can move from path to path. These rails may include positioning means to locate the loads in the separate paths defined by the vertical chain conveyor. Alternatively, the vertical chain conveyor may have, as load support elements, pans or platforms suspended in swing fashion. Also, the feed conveyor has guide elements which align the loads relatively to the load support elements of the vertical conveyor.

Other features of the invention are disclosed in the following description of exemplary embodiments, reference being made to the drawings wherein:

FIGS. 9 to 11 show details of a third embodiment, the top part of FIG. 9 being a view showing the loads in the zone near the supply and entry station, while the bottom part of FIG. 9 is a section through the associated pushing device, the section being along the line G—G in FIG. 10 in the part G—G and along the line F—F in the part F—F.

FIGS. 17 and 18 show an alternative way of mounting the loads on the vertical chain conveyor, FIG. 17 being a view similar to FIG. 3 and looking in the direction indicated by the arrow Z in FIG. 18, while

All the figures of the drawings are in diagrammatic form and show only such parts as are of importance for an understanding of the invention; like elements have like references throughout the drawings.

Figure 1:
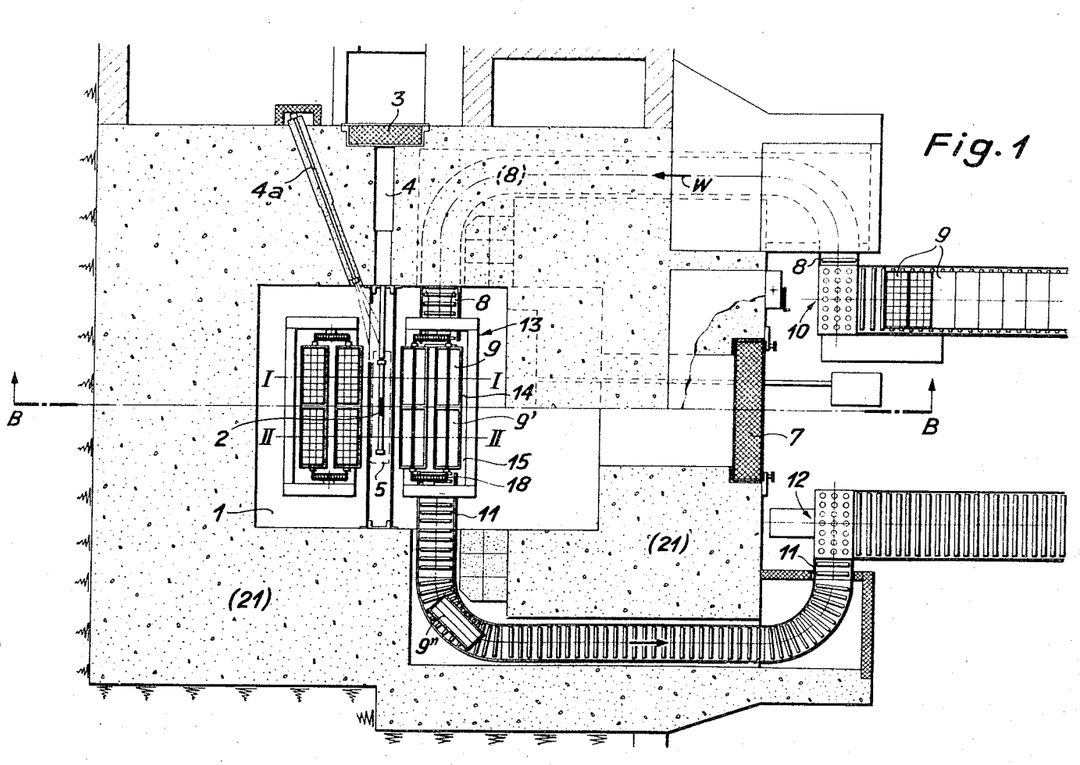
FIG. 1 is a sectional view in plan, taken on the line A—A of FIG. 2, and showing part of an irradiation apparatus according to the invention, and showing the radiation chamber and the supply and discharge device.
Figure 2:
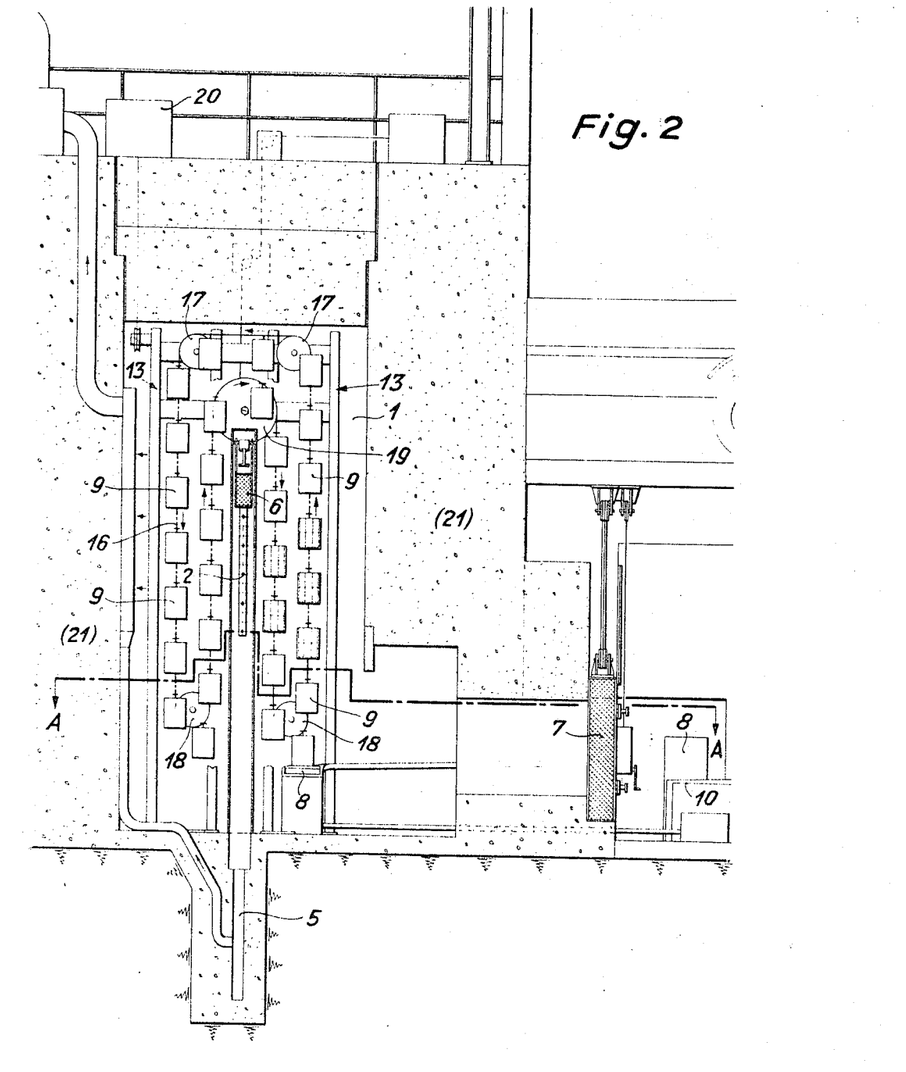
FIG. 2 is a sectional view in elevation taken on the line B—B of FIG. 1.

The irradiation apparatus shown in FIGS. 1 and 2 comprises a radiation chamber 1 into which a radiation source 2, such as cobalt 60, is introduced through a channel 4 having a protective door 3, for example of lead. Below the source 2, which is shown as a multirod surface radiator, is disposed a pit 5. The radiation source 2, which has a protective shield 6 above it (FIG. 2) can be lowered into the pit 5 before the chamber 1 is entered through a shielding door 7. The source 2 can be observed from outside a concrete protection 21 through an observation channel 4a. A feed device 8 supplies the material to be irradiated, in the form of charges or loads 9, to the chamber 1 in the direction indicated by an arrow W. The material is supplied to the feed conveyor 8 automatically or manually at the location 10. The irradiated loads 9″ leave the chamber 1 on a discharge device 11 and are removed therefrom either manually or automatically at location 12.

Rotating means for moving the loads a number of times past the source 2 are disposed around the source in the chamber. In all the embodiments shown, the rotating means take the form of a vertical chain conveyor 13 having two paths or tracks 14, 15 (FIG. 1) which are disposed one beside the other and which enable each charge 9 to pass the source twice. The chains 16 of the conveyor 13 pass over top sprockets 17 (FIG. 2), bottom sprockets 18 and a central reversing sprocket 19. Supports for the loads 9 extend between the two chains 16 and differ in the various embodiments, as will be described in greater detail hereinafter.

Section lines I—I and II—II in FIG. 1 denote planes of motion of the centers of gravity of the loads. The plane of the drawing of FIG. 2 is therefore parallel with these planes. The path travelled by the chain 16 is indicated by arrows in FIG. 2. A drive motor 20 shown in diagrammatic form in FIG. 2 drives the conveyor 13. As can also be seen from FIGS. 1 and 2, the feed and discharge devices 8 and 11 make connection with the vertical conveyor 13 near the bottom right-hand sprocket 18. The protective enclosure 21, which may be primarily of concrete, extends around the irradiation chamber 1 and much of the conveying system 8, 11.

Figures 3, 4, 5:
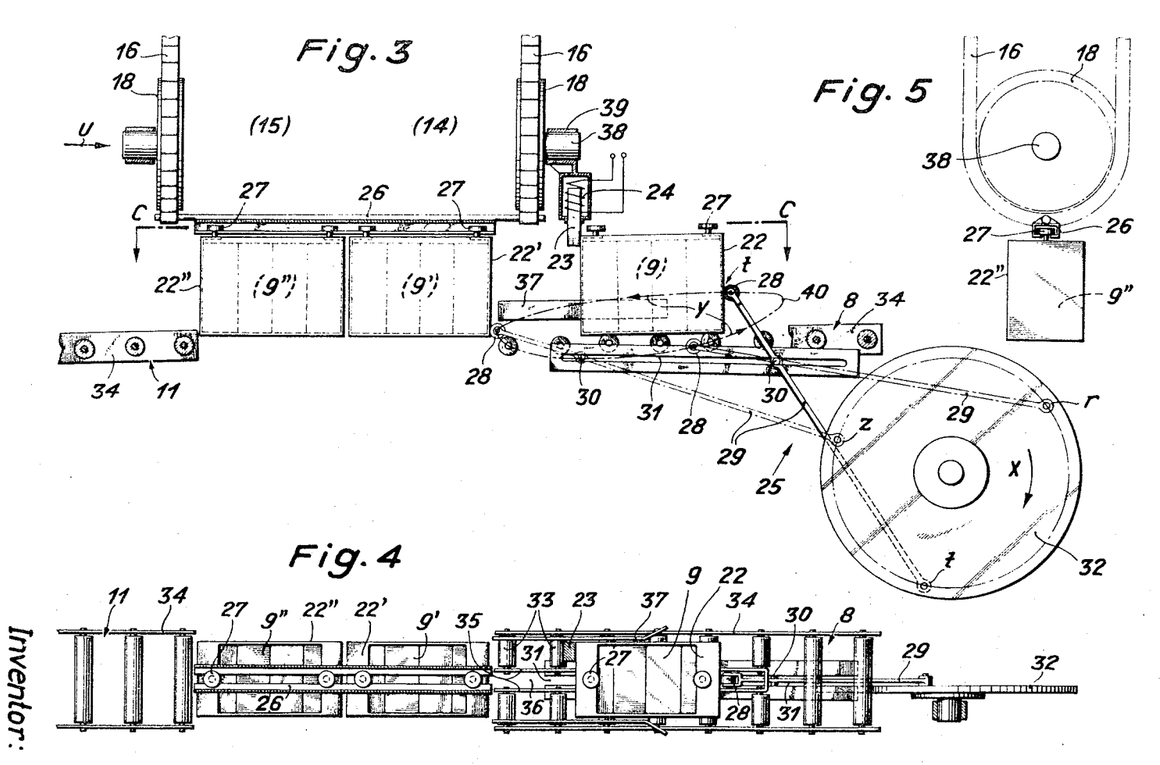
FIGS. 3 to 5 show details of a first embodiment of the invention wherein the conveyor means for transport of the loads about the radiation source take the form of a two-track vertical chain conveyor and wherein the supply and discharge devices take the form of inclined roll table conveyors, FIG. 3 being a diagrammatic side elevation showing the transfer of a load from the supply device to the vertical chain conveyor, and the accompanying transfer of another load device from the vertical chain conveyor to the discharge device, FIG. 4 being a sectional view in plan on the line C—C of FIG. 3, and FIG. 5 being a side elevation of the vertical chain conveyor looking in the direction of an arrow U in FIG. 3.

In the embodiment shown in FIGS. 1 to 5 the feed conveyor 8 and discharge conveyor 11 take the form of gravity-operated roller conveyors. The loads 9, which can take the form of material packed in frames or receptacles 22 of aluminum for example, move over the roller conveyors by their own weight in the direction indicated by an arrow W (FIG. 1), from the loading station 10 to the point of transfer between the feeder 8 and the vertical conveyor 13. At this transfer point an abutment 23 raisable by an electromagnet 24 arrests the receptacles 22 arriving on the conveyor 8. A pusher 25 (FIG. 3) engages with the arriving load 9 and pushes it onto a load support element of the conveyor 13—a slotted bar 26 in this example—into the first path 14. Two mushroom-like suspension elements 27 disposed on each of the receptacles 22 engage with the bar 26. The pusher 25 comprises a connecting rod 29 which has a roller 28 at one end. It is guided by a pin 30 in a horizontal guide 31, and is moved by a crank disc 32 driven by a motor (not shown). The feed conveyor 8 has at its end adjacent vertical conveyor 13 a plurality of elongated rollers 33 mounted in bars 34 and bearing plates 35. The latter bounds a longitudinal aperture 36 through which the connecting rod 29 can extend (FIG. 4). The end of the feeder 8 has above the bars 34 guide plates 37 (FIG. 3) which align the load 9 relatively to the slotted bar 26. Also visible in FIG. 3 are shafts 38 and bearings 39 for the bottom sprockets 18. FIG. 3 also shows the path 40 of the roller 28 on the end of the rod 29.

The elements just described can cooperate, in a manner which will now be described, to load and unload the vertical conveyor 13 and to transfer any load 9′ from the path 14 to the path 15.

A control (not shown) so stops the conveyor 13 that one of its bars 26 stops, with two loads 9′, 9″ thereon in the stop position visible in FIGS. 3 to 5. Another load 9 has moved along the feeder 8 as far as the abutment 23. When the bar 26 stops, the electromagnet 24 energizes briefly and the abutment 23 releases the load 9. The motor driving the crank disc 32, which was previously in its inoperative position r (FIG. 5) simultaneously starts to rotate in the direction indicated by an arrow X. The spindle of the roller 28 therefore moves on its path 40, in the direction indicated by the lower arrow Y, towards the load to be loaded into the conveyor (position t). As the disc 32 moves from position t to position z, the pusher 25 pushes the nonirradiated load 9 onto the conveyor 13 into the position occupied in FIG. 3 by the load 9′, which has made one circuit on conveyor 13 past the radiation source. Simultaneously with the loading of load 9 onto the conveyor, load 9′ is shifted from the right-hand path 14 to the left-hand path 15, and the load 9″ which has made two circuits is pushed off the conveyor 13 onto discharge conveyor 11.

Figures 6, 7, 8:
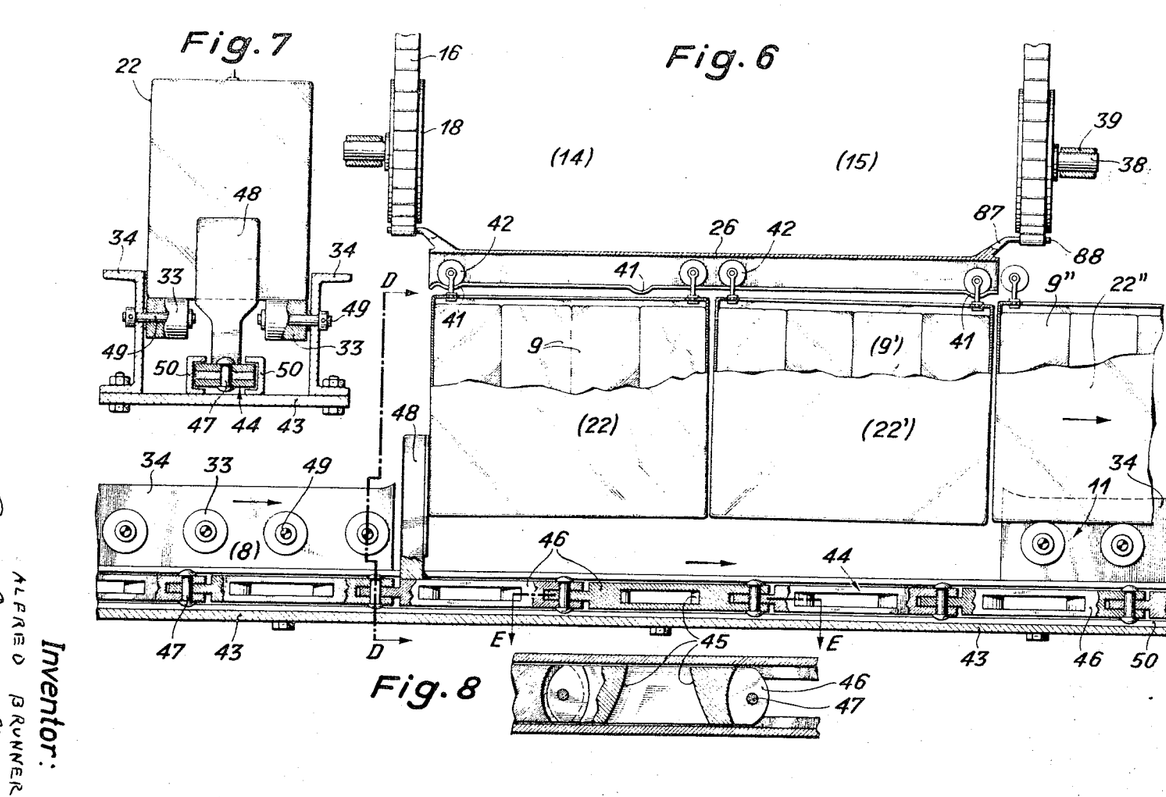
FIGS. 6 to 8 show details of a second embodiment, FIG. 6 being a view similar to FIG. 3, FIG. 7 being a section in elevation on the line D—D of FIG. 6 and FIG. 8 being a section in plan on the line E—E of FIG. 6.

In the embodiment of FIGS. 6 to 8, the slotted bars 26 of FIGS. 3 to 5 are replaced by I-beam rails 26, the lower flange of which includes a notch engageable by one pair of rollers 42 on the load containers at each of the positions 14 and 15 transversely of conveyor 13 in which the loads are to make a circuit. A third notch 41 is shown, between the two extreme ones, to permit operation with suitably shortened containers in a three-circuit mode.

The construction of the rollers 42 will be described in greater detail with reference to FIGS. 12 to 15.

In contrast to the first embodiment, the feeder 8—on the left in FIG. 6—and the discharge conveyor 11—on the right in FIG. 6—are driven by an endless chain 44 which runs along a base 43 (FIG. 7) of the feeder and discharge conveyor system. The chain 44, which is built up from precision castings 46 having tooth flanks 45, runs around the feeder and discharge conveyor system shown in FIG. 1 in a guide 50 and bridges the gap between the stations 10 and 12 (FIG. 1). A motor (not shown) drives the chain 44 intermittently via a gear wheel (not shown) which engages with the flanks 45. The various precision castings 46 are articulated to one another by rivets 47. Secured to one or more of the castings 46 are entraining members 48 (FIGS. 7 and 8) which drive the load containers 22. In order that the members 48 may slide in the chain-way, all the rollers of the slideways in the conveyors 8, 11 are narrow elongated rollers 33 mounted in overhung fashion on pins 49 at the side bars 34, as indicated in FIG. 7.

In this embodiment the containers are moved as follows:

A bar 26 on conveyor 13 having two loads 9′, 9″ on it reaches a stop position with the bar lowermost on sprockets 18, whereupon the movement of the vertical conveyor 13 is interrupted. The member 48 moved along by the chain 44 pushes a load 9 into the path 14 of the conveyor, the load 9′ being shifted into the path 15 and the load 9″ being shifted onto the discharge conveyor 11. The chain 44 is then stopped and the conveyor 13 started. Once the bar 26 with its fresh loads has risen and thus cleared a path for the member 48 to pass through, the chain 44 starts to move, and the member 48 passes through the zone below the conveyor 13 and conveys the fully irradiated load 9″ to the discharge station 12 where such load is branched off the roller conveyor.

The entraining member 48 is therefore ready to engage with, and supply to the conveyor 13, another non-irradiated load at the next stoppage of the vertical conveyor 13. If the stopping times of the latter are short, the chain 44 starts to move the load before the conveyor 13 has stopped. The chain 44 can make an intermediate stop in a stand-by position. If there are a number of entraining members 48, the chain 44 rotates in stages; in this case, after each advance of the chain 44 by a stage corresponding in length to the spacing between two consecutive entraining members 48, a load shift onto and off conveyor 13 occurs in the manner hereinbefore described. The number of stages of movement of the chain 44 depends upon the number of chain links 46 which have entraining members 48. The sequence of motions of the two driven devices, the conveyor 13 and the chain 44, can be automatically controlled, for instance, by a step control, either by program or manually.

Figure 9:
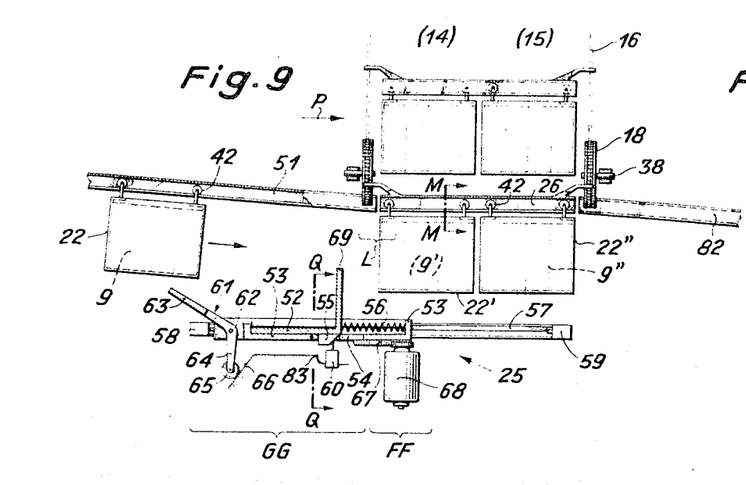
Figure 10:
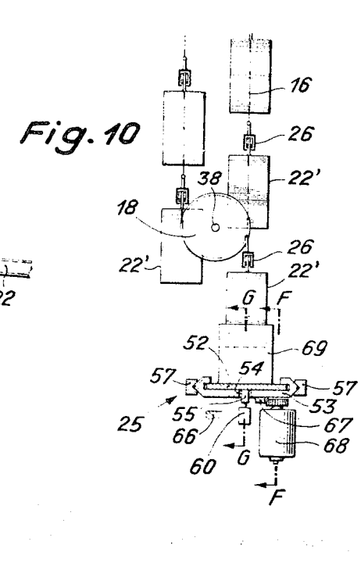
FIG. 10 is a side elevation of the apparatus as seen in the direction indicated by an arrow P in FIG. 9.
Figure 11:
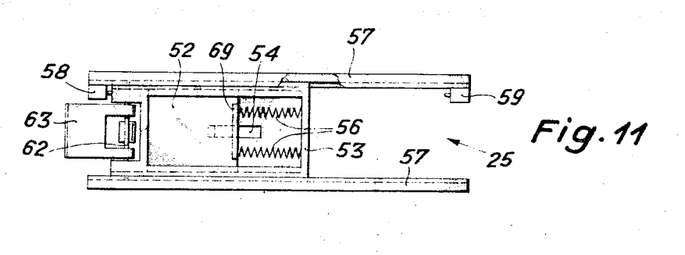

In the third embodiment, which is shown in FIGS. 9 to 11, the feeder conveyor 8, on the left in FIG. 9, and the discharge conveyor 11 on the right in FIG. 9, take the form of inclined rails 51, 82 along which the containers 22 bearing the loads 9 move by gravity on rollers 42. The only other feature, apart from the bars 51, 82, which differs from the other examples is the pusher device 25 which takes the form of two relatively movable slides 52, 53, the outer slide 53 forming a slideway for the inner slide 52. Slide 53 includes a slot 54 through which extends a projecting lug 55 of the inner slide 52 (FIG. 10). Springs 56 retain the inner slide 52 normally in engagement with an abutment at the left end of the slideway, as seen in FIG. 9. The outer slide 53 moves under influence of motor 68 in two lateral guides 57, having electric limit switches 58, 59, one at each end (FIG. 9). Below the slot 54 is a stationary electric detector switch 60 closable by the projection 55 of the inner slide 52 against the force of a spring 76 shown in FIG. 16. The outer slide 53 has pivoted thereto at 62 a double-armed lever 61. One end 63 of this lever is shaped as a plate. Disposed at the other end of the lever is a roller 65 adapted to move on a cam 66. Also disposed on the outer slide 53 is a toothed rack 67 which engages with a pinion of the electric motor 68 which drives the slide 53 via the rack 67 and pinion.

Figure 16:
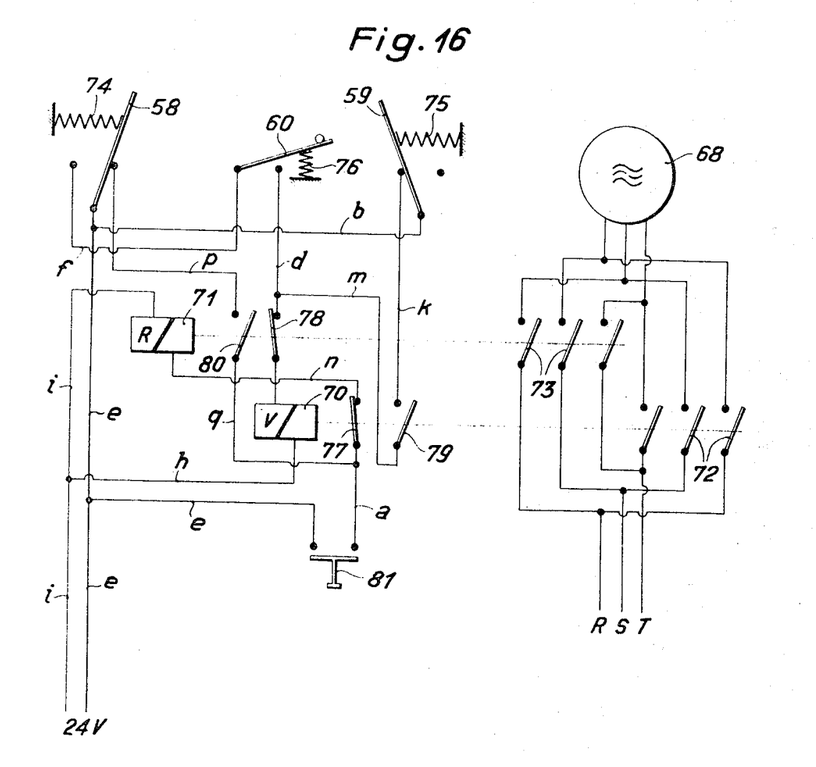
FIG. 16 is a circuit diagram for the control of the electric motor of the pushing device of the latter embodiment.

The circuit diagram in FIG. 16 shows the two limit switches 58, 59 which springs 74, 75 bias toward the position shown in FIG. 16, subject to being set in the opposite position by outer slide 53. FIG. 16 also shows the detector switch 60 which the projection 55 can close and which the spring 76 can open. All these switches are disposed in a control circuit operating on a voltage, for instance, of 24 volts. The control circuit includes polarized relays 70 and 71 which energize when current flows through the control circuit, one of the relays being associated with forwards running (V) of the motor 68 and the other being associated with reverse running (R) of the motor 68. To this end, the relays 70, 71 operate three-pole switches 72, 73 disposed in the phase lines to the three-phase motor 68. The 24-volt control circuit also includes two safety switches 77, 78 and two hold switches 79, 80, all four of which are opened or closed by the relays 70, 71. The control circuit also includes a pressbutton or key or the like 81.

The events associated with the loading and unloading of the conveyor 13 and with shift therein of loads from one track 14 therein to the other track 15 will now be described with reference to FIGS. 9 and 16. For shift, it will initially be assumed that the vertical conveyor 13 has stopped in such a position that its bar 26 is aligned with the rails 51 and 82. A container 22 which contains a non-irradiated load and which is arriving along the inclined rail 51 is retarded by the vertical abutment 69 of the inner slide 52, the latter being moved as a result to the right against the action of the springs 56. The projection 55 on inner slide 52 therefor closes the switch 60 against the stress of spring 76. The switch 58 is at this time held by slide 53 in the position opposite that shown therefor in FIG. 16. An energizing circuit for the relay 70 is therefore established from the power source of the 24-volt circuit via line $e$, switch 58, line $f$, switch 60, line $d$, safety switch 78, relay 70 and lines $h$ and $i$. The relay 70 closes the three-pole switch 72 of the "forward" circuit for the motor 68 and the switch 79 of a holding circuit for relay 70 via switch 59, which is in the left-hand position shown for it in FIG. 16. The holding circuit holds relay 70 energized even after the switch 60 opens when cam 55 slips off the switch with motion of slide 52 to the right. The holding circuit comprises line $e$, line $b$, switch 59 (retained by spring 65 in its left-hand position—as shown in FIG. 16), line $k$, holding switch 79, line $m$, safety switch 78, relay 70 and lines $h$ and $c$.

Upon closure of the switch 72 the motor 68 starts to run forwards and moves the outer slide 53 to the right, so that the switch 58 is released and forced by the spring 74 against its right-hand contact. The motor 68 continues to run forwards until the relay 70 drops out due to the outer slide 53 reversing the setting of switch 59. The slide 53 then remains at rest in its right-hand end position.

Reverse running of the motor 68 is initiated by operation of a pushbutton switch 81, so that current flows through line $e$, switch 81, line $a$, switch 77 (closed because the relay 70 has dropped out), line $n$, relay 71 and line $i$. The relay 71 picks up, closes the three-pole switch 73 and the holding switch 80, and opens the safety switch 78. The function of the switch 80 is to hold the relay 71, after release of the switch 81, the holding circuit comprising line $e$, switch 58, line $p$, line $q$, switch 77 and lines $n$ and $i$. Relay 71 remains energized until the slide 53 operates the switch 58, against the force of the spring 74, at the left-hand end of its slideway, so that the motor 68 stops and the slide 53 is restored to its initial position.

The function of the safety switches 77, 78 is to prevent a short circuit between phases in the circuit of the motor 68, for example if the switch 81 were operated accidentally while the motor is running forwards.

The movement of the slides 52, 53 produces the following mechanical operations. As soon as the slide 53 starts to move, the freshly supplied load container 22 at the left in FIG. 9 is retained between the stop 69 and the plate-like lever arm 63, the roller 65 on the lever arm 64 rising along the cam track 66 and the lever arm 63 pivoting to the right around the pivot pin 62 as slide 53 is driven to the right. The container is thus held fixed with respect to slide 53 until, as the slide moves to the right in FIG. 9, the roller 65 reaches the edge 83 of the cam track 66. By then, however, the container is engaged at its front rollers 42 on the bar 26. Simultaneously, the abutment 69 of the slide 52 pushes the container 22′ from path 14 to path 15 on conveyor 13, and container 22′ in turn pushes container 22″, which contains the fully irradiated load 9″, onto the rail 82 of the discharge conveyor 11. The load 9″ slides along the rail 82 to the station 12 outside the radiation protective screen 21 (FIG. 1).

The descent of the roller 65 of the lever arm 64 along the edge 83 releases the arriving container 22 from its fixed anchorage on the slides 52, 53, whereafter the vertical conveyor 13 starts to rise, so that the bar 26 with the receptacles 22, 22′ on it rises; once the return path is free the pressbutton 81 can be operated to return the slides 52, 53, as hereinbefore described, to the initial position, the springs 56 forcing the slide 52 to the left-hand end of the outer slide 53. The system is then ready for the next loading step displacing event. As in the previous cases, the control can be either programmed (not shown) or manual.

Figure 12:
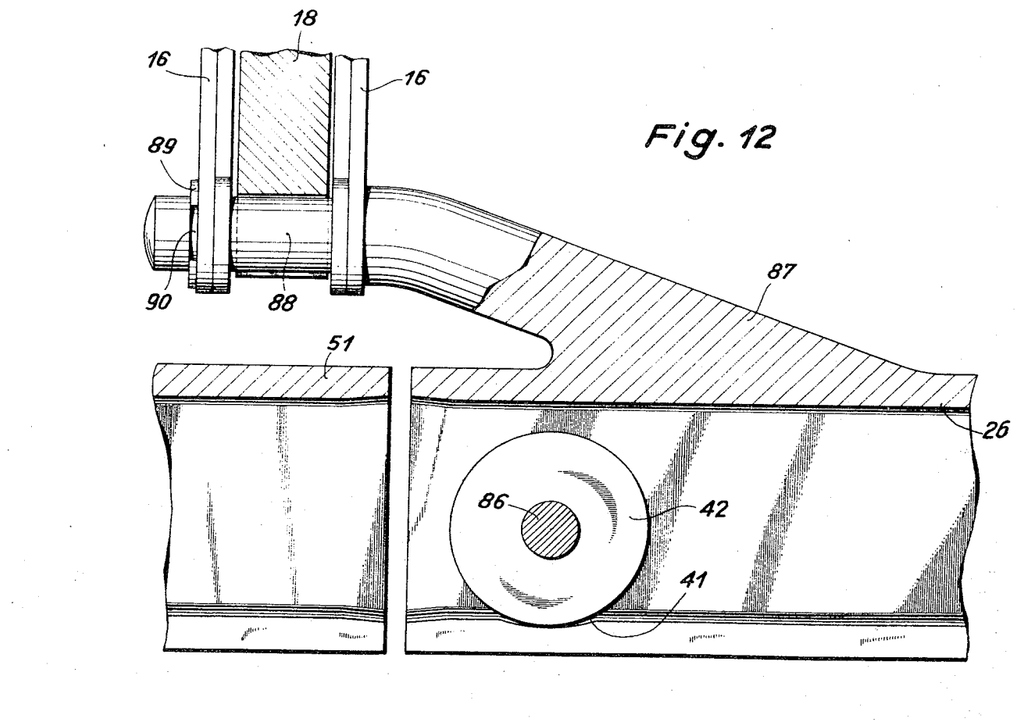
FIGS. 12 to 15 show details and alternative arrangements for securing the loads to the vertical chain conveyor, FIG. 12 being a section on the line K—K in FIG. 13 in the zone L of FIG. 9, FIG. 14 being a section on the line N—N of FIG. 13, FIG. 13 being a section on the line M—M of FIG. 9, and FIG. 15 being a view, in a section similar to FIG. 13, of another embodiment for the suspension of the load.
Figure 13:
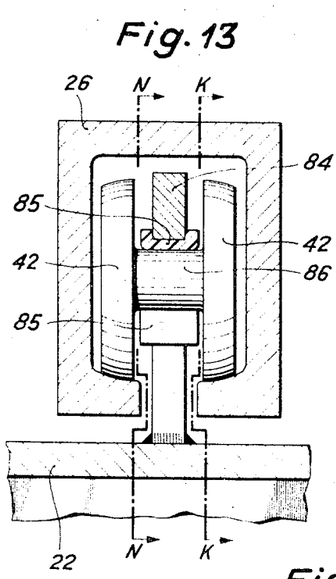
Figure 14:
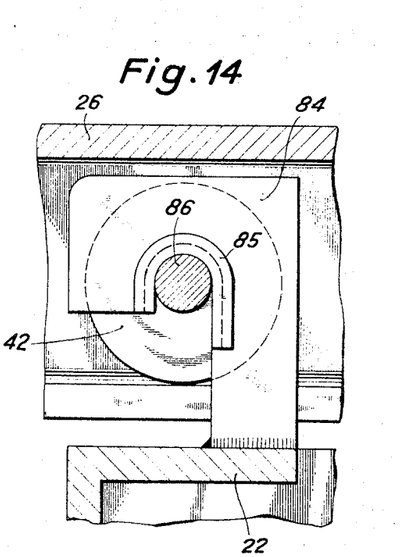

As already stated, FIGS. 12 to 15 are views to an enlarged scale of various details and of two different ways in which the containers 22 can be suspended on the bars 26. As shown in FIGS. 12 to 14, the receptacle 22 has welded to it two hooks 84 each receiving a partial shell 85 made of a bearing material, such as plastics or sintered metal. The hooks are suspended on rollers which comprise two cylindrical end plates 42 and a shaft 86 interconnecting the same and which run in the bar 26. The same is in the form shown in FIGS. 5 and 10—a hollow parallelepiped which is of rectangular cross-section with a bottom aperture, as shown in FIG. 13.

FIG. 12 shows a structure for suspending the bar 26 on a chain 16 of the vertical conveyor 13. The suspension comprises a projection or lug on the bar 26; the projection 87 extends inclinedly near the bar 26 and terminates in a connecting pin 88 for two links of the chain 16. A spring ring 89 can be placed in an annular groove 90 in the pin 88 to prevent the chain links and the pin 88 from moving relatively to one another. In FIG. 12 the roller 42 of a container 22 rests in a recess 41 of bar 26 as already described with reference to FIG. 6.

Figure 15:
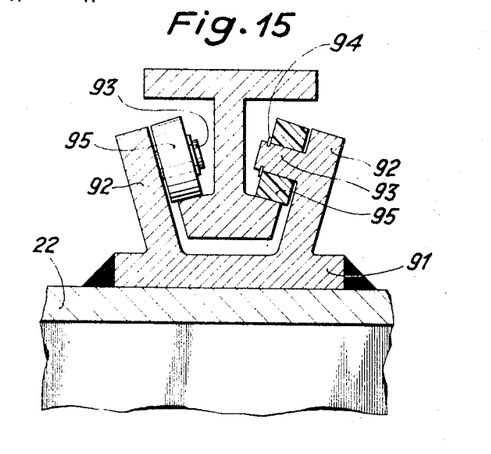

In the suspension shown in FIG. 15 the bar 26 is T-shaped in section. The receptacle 22 has welded to it a U-shaped member 91 bearing on its two slightly inclined vertical flanks 92 journals 93 on which small rollers 95, for instance, of plastic are rotatably mounted and secured by circlips 94. The two plastic elements 85 (FIGS. 13, 14) and 95 (FIG. 15) should provide lubrication for the relative motion between the rollers and their journals or spindles and are therefore made of one of the known self-lubricating plastics. Since radiation alters plastics, the elements 85, 95 require frequent replacement and are therefore arranged for rapid and simple replacement.

Figure 17:
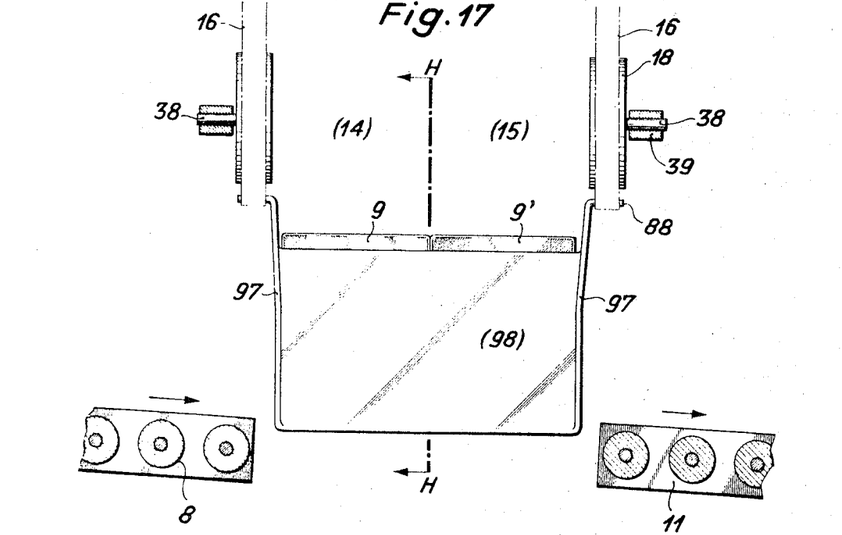
Figure 18:
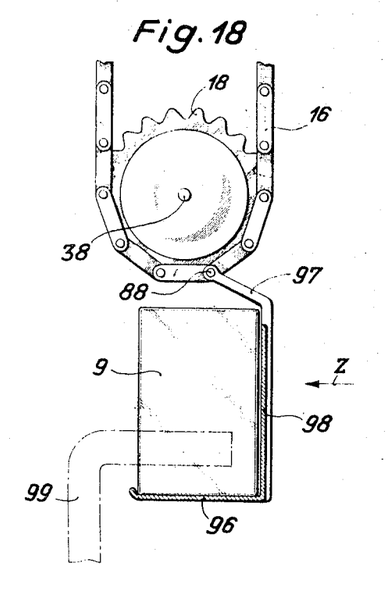
FIG. 18 is a section on the line H—H of FIG. 17.

If, for instance, it is required to irradiate the material in its packing for dispatch directly as a load 9 without placing it in a frame or receptacle 22, the function of the bar 26 can be performed by pivoting platforms 96 suspended between the conveyor chains 16 as shown in FIGS. 17 and 18. The platforms 96 are connected to the chains 16 by hangers 97 which, like the projection 87 in FIG. 12, terminate in pins 88 for connection to the chain links. The hangers 97 are interconnected by the platform 96 which in the example shown (FIG. 17) is of the full width of the conveyor. The hangers 97 are interconnected as well by a rear wall 98 which extends over the complete length between the hangers 97 and substantially to the top edge of the loads 9. The advantage provided by the rear wall 98 over cross-members interconnecting the pins 88 is that the closed rear wall 98 reduces the radiation uniformly over the whole height of the loads. An arm 99 of a pushing device is shown in FIG. 18; by way of example the feed conveyor 8 and discharge conveyor 11 shown in FIG. 17 are embodied as inclined roller conveyors.

Although all the rotating means have been shown as vertical chain conveyors and all the feeder and discharge conveyors have been shown as substantially horizontal, the conveyance planes of the rotating means can be horizontal and the feeder and discharge conveyance can be effected substantially vertically.

The invention thus provides apparatus for the irradiation of material in discrete loads by passage of such loads over a plurality of closed paths adjacent to a source of radiation. These closed paths are defined by transport means which in the embodiments described take the form of an endless chain conveyor. Feed and discharge devices, which may also take the form of conveyors, extend transversely of the closed paths of motion and terminate adjacent those paths at fixed loading and unloading stations. These feed and discharge conveyors may be gravity driven or positively driven, and along them the loads are moved to and from the loading and unloading stations respectively.

The endless chain conveyor defines a plurality of parallel closed paths (over the loads may be moved) with the aid of load supporting and guiding means such as the bars or rails 26 of FIGS. 3, 6 and 9 and the pans 96 of FIGS. 17 and 18. These rails and pans support each a plurality of loads side-by-side, and upon motion of the conveyor each such load traverses a closed path. The loading and unloading stations are positioned so that the ends of the rails or pans can be aligned with those stations by suitably adjusted motion of the conveyor. The rails 26 and pans 96 are, moreover, so arranged that upon the introduction of a load onto such rail or pan at one end, a load will be ejected from the rail or pan at the other end thereof. The feed device advantageously includes, as illustrated in the alternative embodiments of FIGS. 3 and 9, apparatus which serves positively to advance a load arriving at the loading station onto one of the load guiding and supporting means of the closed path conveyor. Such advance introduces a fresh load onto the closed path conveyor for irradiation and advances from one path to another loads already on the conveyor, and ejects onto the discharge device a load which has traversed all of the paths provided by the load guiding and supporting means. In the alternative embodiment of FIG. 6, the means to effect positive introduction of a fresh load onto the load guiding and supporting means takes the form of a bar or bars 48 constituting part of an endless chain by means of which the loads are in addition positively advanced from a remote point outside a radiation shield down to the loading station and from the unloading station to another remote point also outside a radiation protective shield.

While the invention has been described herein in terms of a number of preferred embodiments, the scope of the invention itself is set forth in the appended claim.

I claim:

1. Apparatus for the irradiation of material in discrete loads, said apparatus comprising means to support a source of radiation, an endless chain conveyor defining a closed path of motion adjacent said source, a plurality of containers having suspension gear thereon, and means to deliver said containers to and to withdraw said containers from said chain conveyor, said chain conveyor including two endless chains, a plurality of pairs of co-axial sprocket wheels engaged by said chains, one of said pairs of sprocket wheels defining a low point in said path at which said chains pass under and in engagement with the wheels of said one pair, and cross-bars connected between the chains, said cross-bars having each a substantially horizontal load-carrying rail extending below the periphery of the sprocket wheels of said one pair upon passage of said cross-bars around the sprocket wheels of said one pair, said load delivery and withdrawal means including a delivery conveyor and a withdrawal conveyor substantially collinear with each other, substantially parallel to the axes of the sprocket wheels of said one pair, and positioned adjacent the lower limit of the periphery of the sprocket wheels of said one pair in position to align with the load-carrying rail of a cross-bar at said lower limit the suspension gear of any of said containers on said delivery conveyor and the suspension gear of any of said containers on said withdrawal conveyor, said apparatus further including means to advance containers from said delivery conveyor onto said last-named rail.

References Cited

UNITED STATES PATENTS

| 3,142,759 | 7/1964 | Jefferson et al. | 250—106 |
| 3,224,562 | 12/1965 | Bailey et al. | 198—131 |

FOREIGN PATENTS

| 934,217 | 8/1963 | Great Britain. |

WILLIAM F. LINDQUIST, *Primary Examiner.*

U.S. Cl. X.R.

250—106